UNITED STATES PATENT OFFICE.

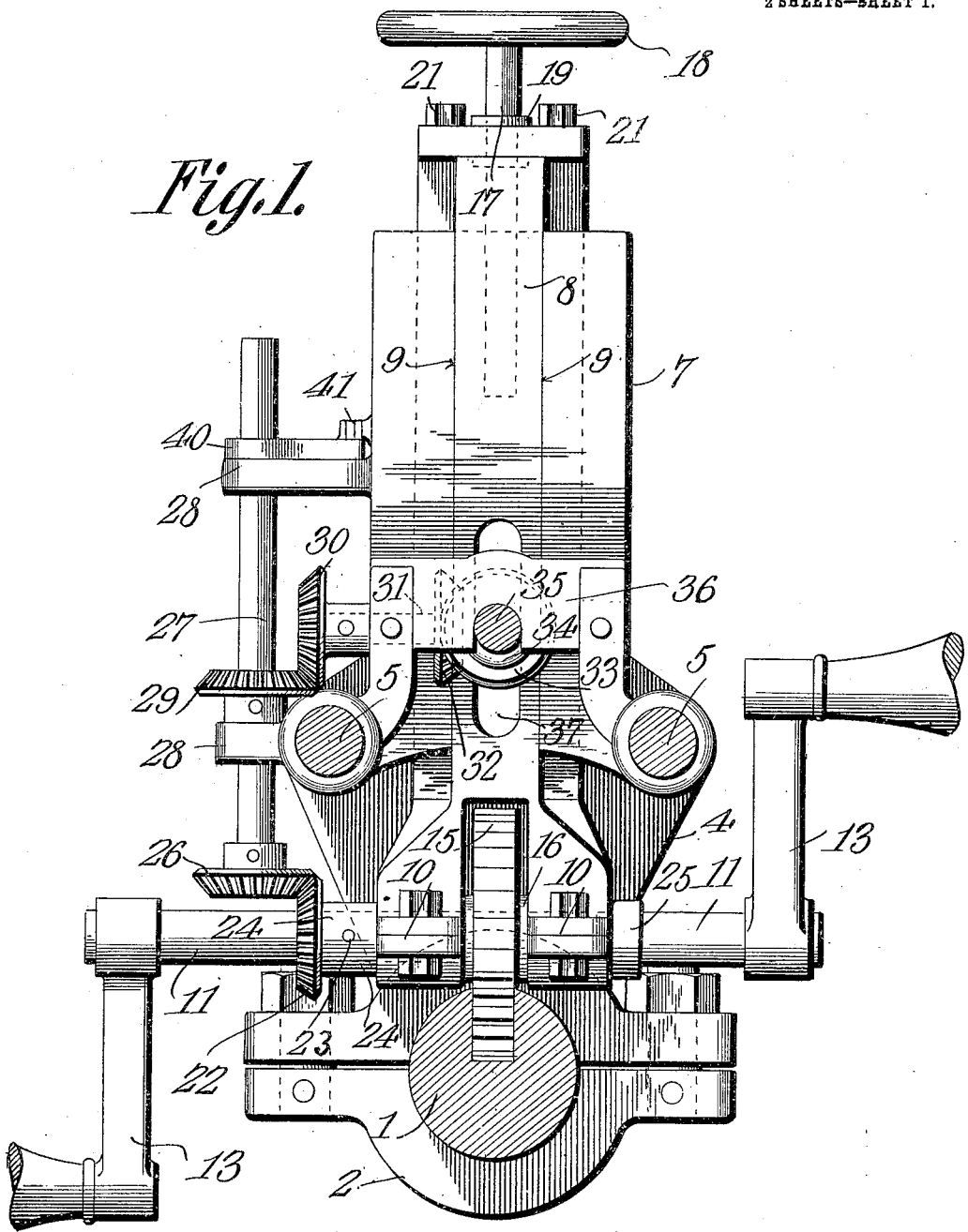

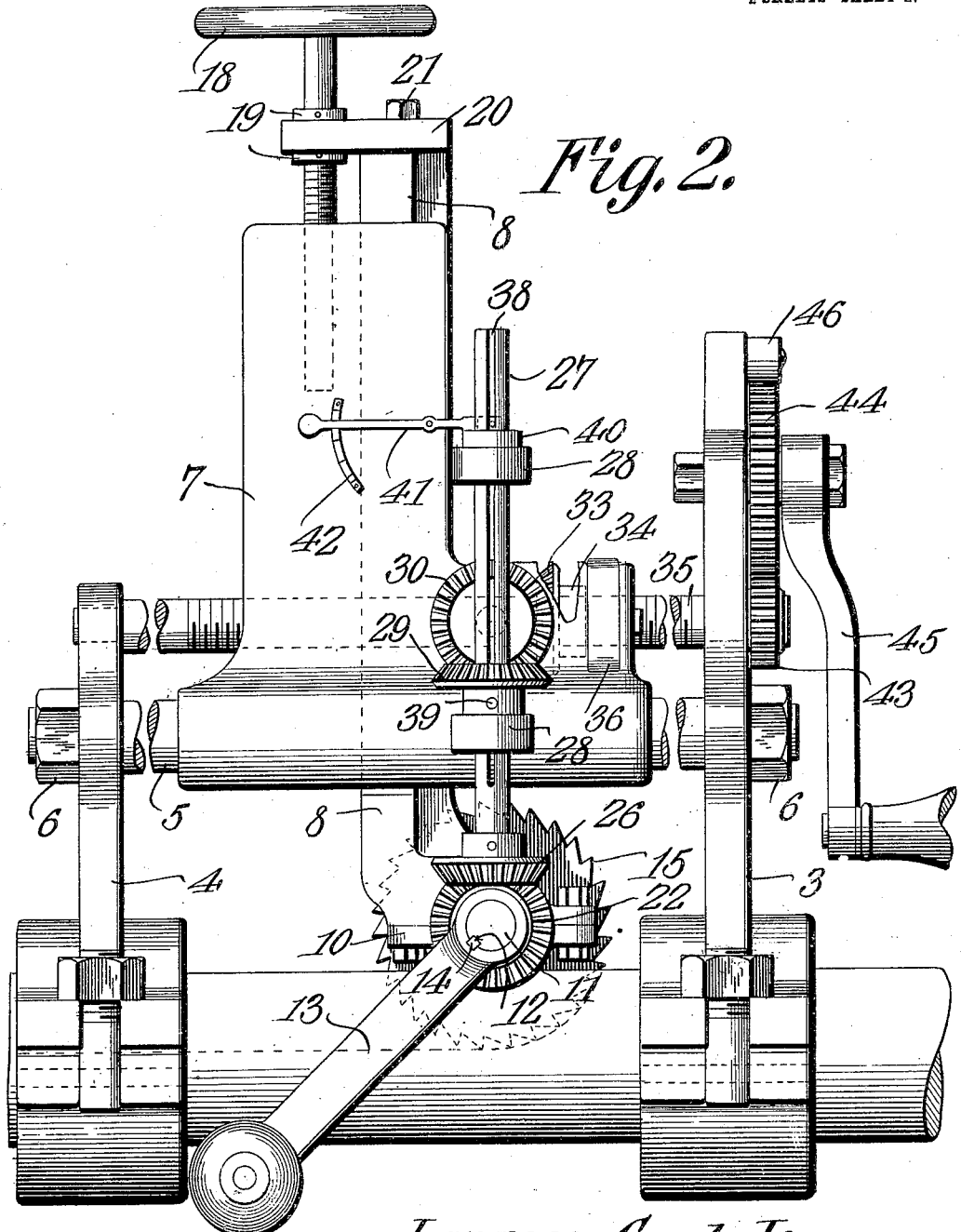

LAURENCE GOAD, JR., AND CHARLES W. HAYES, OF WATERTOWN, ILLINOIS.

MACHINE FOR CUTTING KEYWAYS IN SHAFTS.

No. 922,691.   Specification of Letters Patent.   Patented May 25, 1909.

Application filed September 8, 1906, Serial No. 333,848. Renewed April 6, 1909. Serial No. 488,292.

*To all whom it may concern:*

Be it known that we, LAURENCE GOAD, Jr., and CHARLES W. HAYES, citizens of the United States, residing at Watertown, in the county of Rock Island and State of Illinois, have invented a new and useful Machine for Cutting Keyways in Shafts, of which the following is a specification.

This invention relates to machines for cutting keyways in shafts.

The objects of the invention are to improve and simplify the construction of such devices; furthermore, to increase their efficiency in operation and to decrease the expense attending their manufacture.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of the following claims without departing from the spirit of the invention or sacrificing any of its advantages.

In the accompanying drawings forming part of this specification: Figure 1 is an end elevation, partly in section, showing a machine constructed in accordance with the invention; and Fig. 2 is a side elevation.

Like reference numerals indicate corresponding parts in the different figures of the drawings.

The improved keyway cutting machine of this invention includes any suitable means for securing the same firmly upon the shaft 1 which is to be formed with a keyway. In the embodiment of invention illustrated, the means for securing the machine in position consists of a pair of clamping devices 2 which may be of any suitable form and construction. Connected with the clamping devices 2 is a pair of supporting members 3—4 which preferably are in the nature of upright plates. The supporting members 3 and 4 serve to uphold a pair of parallel guide rods 5 which are suitably connected at their ends with said supporting members by means of nuts or other devices 6. Slidably mounted upon the guide rods 5 so as to move longitudinally of the shaft 1 is a machine head 7 which carries the keyway cutter and other operating parts of the machine, as will hereafter appear.

Slidably connected with the head 7 in any suitable manner is a cutter carrier 8 which preferably is in the nature of an elongated metal plate having beveled edges which engage the side walls of a vertical dovetail recess 9 in the head 7. The lower end of the cutter carrier 8 is suitably bifurcated and provided with a pair of spaced bearings 10 in which is journaled the main shaft 11 of the machine. The main shaft 11 is formed with a keyway 12 which preferably extends the entire length thereof. Mounted upon the opposite ends of the main shaft 11 is a pair of oppositely extending crank handles 13 which constitute means for rotating the main shaft, said crank handles being held in position preferably by means of readily removable keys 14. Splined or feathered upon the main shaft 11 between the spaced bearings 10 is a keyway cutter 15 which consists preferably of a toothed disk. The keyway cutter 15 is provided with integral hubs or sleeves 16 which contact with the spaced bearings 10 and serve to hold the cutter in proper position without permitting it to move laterally between the bearings 10. Whenever it is desired to change the cutter 15, either for the purpose of supplying a new cutter or of substituting a cutter of different size or width, one of the keys 14 and crank handles 13 is removed so as to permit the main shaft 11 to be withdrawn longitudinally from the bearings 10. A new cutter 15 is then fitted between the bearings 10 and the shaft 11 is replaced. It will be understood that whenever the new cutter is narrower and broader than the old cutter, the hubs or sleeves 16 of said new cutter will be correspondingly longer or shorter than those of the old cutter so as to contact properly with the spaced bearings 10 and thus prevent any play of the cutter.

The preferred means for adjusting the cutter carrier 8 vertically with respect to the machine head 7, so as to regulate the depth of the keyway which shall be formed by the cutter 15, consists of a rod 17 which is threaded into a suitable socket in the upper end of the head 7 and is provided with a handle 18. Mounted upon the threaded rod 17 is a pair of spaced collars 19 between which the threaded rod 17 is loosely engaged by a plate 20 held in position upon the upper end of the cutter carrier 8 by means of screws or other devices 21. It will be obvious that the spaced collars 19 serve to produce a swivel connection between the plate 20 and the threaded rod 17 so that by rotating said rod the cutter carrier 8 and, consequently, the cutter 15, will be raised or lowered to regulate the depth of the keyway.

The preferred means for feeding the machine head 7 along the guide rods 5, so as to move the cutter 15 longitudinally of the shaft 1, comprises a bevel wheel 22 which is mounted upon the main shaft 11 by means of a pin or other device 23 extending through the hub 24 thereof, said hub 24, in conjunction with a readily removable collar 25, serving incidentally to prevent accidental longitudinal movement of the main shaft by contacting with opposite sides of the spaced bearings 10, it being understood that the collar 25 is loosened and removed when it is desired to change cutters. The bevel wheel 22 for feeding the cutter longitudinally of the shaft, is in mesh with a bevel wheel 26 mounted upon a vertical shaft 27 which is suitably journaled in bracket arms 28 upon the head 7. Above the lower bracket arm 28, the vertical shaft 27 is provided with a bevel wheel 29 which is in mesh with a similar gear wheel 30 upon a stud shaft 31 journaled in the machine head 7 and provided at its opposite end with a bevel wheel 32 meshing with a similar wheel 33. The bevel wheel 33 is provided with an internally threaded hub or sleeve 34 which surrounds a threaded feed rod 35. The threaded feed rod 35 is mounted at its ends upon the supporting members 3 and 4 in such manner that it can be either rotated, for a purpose which will be hereafter explained, or can be held stationary. When the feed rod 35 is locked in stationary position, it will be obvious that the rotation of the main shaft 11 together with the cutter 15 and bevel wheel 22 will, through the bevel gear wheels 26, 29, 30, 32 and 33, cause the internally threaded sleeve 34 to move along the feed rod 35. The sleeve 34 abuts against a cross-piece 36 which is suitably connected with the machine head 7 and is provided with a perforation through which the feed rod 35 extends. It will be apparent that the sleeve 34 by pressing against the cross-piece 36 will move the head 7 longitudinally along the guide rods 5, thereby carrying the keyway cutter 15 along the shaft 1. The cutter carrier 8 is formed with a vertical slot 37 which permits the passage of the threaded feed rod 35 without interfering with the vertical adjustment of said cutter carrier.

For the purpose of permitting the above described feeding mechanism to be thrown out of operation whenever it is desired to cut a deep slot in the shaft without permitting longitudinal movement of the machine head 7 upon the guide rods 5, the vertical shaft 27 is adapted to be moved longitudinally or vertically in the bracket arms 28, said shaft for this purpose being formed with a keyway 38 engaged by a suitable key 39 upon the bevel wheel 29. At its upper end the vertical shaft 27 extends loosely through one end of a clutch 40, with the other end of which clutch is connected a small lever 41 adapted to coöperate with a toothed rack 42. Whenever it is desired to raise the vertical shaft 27 so as to move the bevel wheel 26 out of mesh with the bevel wheel 22 and, consequently, prevent longitudinal movement of the head 7 upon the guide rods 5, the lever 41 is depressed. By reason of the fact that the lever 41 is connected with only one end of the clutch 40, said clutch will be moved into an angular position with respect to the vertical shaft 27 and will consequently grip the same and lift it upward. The lever 41 will then be interlocked in any suitable manner with the toothed rack 42 so as to hold the shaft 27 in raised position. It will be apparent that whenever it is necessary, on account of the depth of the keyway, to operate the cutter 15 for some time in one position without feeding the head 7 longitudinally along the shaft 1, this operation can be readily accomplished by merely operating the lever 41, as described.

It will be understood that at the end of the operation of cutting a keyway in a shaft, the head 7, through the rotation of the main shaft 11, will have been moved some distance along the guide rods 5, the degree of this movement depending upon the length of the keyway which has been cut. In order to provide means for quickly moving the head 7 back to initial position without reversing the rotation of the main shaft 11, the threaded feed rod 35 is suitably journaled in the supporting members 3 and 4, as previously mentioned. At one end thereof the feed rod 35 is provided with a gear wheel 43 which is adapted to be rapidly rotated by means of a larger gear wheel 44 with which is connected a crank handle or other equivalent device 45. It may be here explained that when the shaft 27 is raised by means of the lever 41, the clutch serves to prevent any rotation of said shaft. It will be obvious, therefore, that the gear wheel 29 which is splined on the shaft 27 is also stationary and, consequently, serves to hold the internally threaded sleeve 34 stationary through the medium of the stud shaft 31 and bevel wheels 32 and 33. By reason of the fact that the internally threaded sleeve 34 upon the head 7 is held stationary, it will be obvious that the rapid rotation of the threaded feed rod 35 by means of the crank 45 will cause the head 7 to be rapidly fed rearward to its initial position.

For the purpose of holding the feed rod 35 stationary during the forward feeding movement of the head 7, a pawl 46 is adapted to be dropped into the teeth of the gear wheel 44.

The improved machine of this invention is strong, simple, durable and inexpensive in construction as well as thoroughly efficient in operation.

What is claimed is:—

1. A machine for cutting keyways comprising a clamping device, guide rods connected thereto, a head movably mounted on the guide rods and having a groove therein, a carrier slidably mounted within the groove, means engaging the carrier and head for adjusting said carrier upon the head, a normally stationary screw extending through the head and carrier and supported in the clamping device, a gear rotatable thereon and internally threaded to engage said screw, said gear being held against longitudinal movement, a main shaft journaled within the carrier, a cutter carried thereby, a shaft journaled within the head, a gear thereon meshing with the gear upon the screw, an intermediate shaft, means upon the shafts for transmitting rotary motion from the main shaft to the shaft in the head, and means for shifting the intermediate shaft longitudinally into inoperative position.

2. A keyway cutting machine comprising a pair of clamping devices, supporting members connected with said clamping devices, guide rods connected with said supporting members, a head slidable on said guide rods, a cutter carrier slidably connected with said head and having spaced bearings, a main shaft removably journaled in said spaced bearings and having a longitudinal keyway, a cutter keyed on said shaft between said spaced bearings and having hubs engaging said bearings, a gear wheel carried by said main shaft, a vertical shaft slidably mounted on said head and having a gear wheel in mesh with the gear wheel on said main shaft, a threaded feed rod journaled upon said supporting members, a threaded sleeve surrounding said feed rod, gearing connecting said threaded sleeve with said vertical shaft, means for raising and lowering said vertical shaft, means for locking said feed rod against rotation, and means for rotating said threaded rod when unlocked.

In testimony that we claim the foregoing as our own, we have hereto affixed our signatures in the presence of two witnesses.

LAURENCE GOAD, Jr.
CHARLES W. HAYES.

Witnesses:
W. A. CROOKS,
C. C. PINNICK.